United States Patent [19]

Reiser et al.

[11] Patent Number: 4,769,297
[45] Date of Patent: Sep. 6, 1988

[54] SOLID POLYMER ELECTROLYTE FUEL CELL STACK WATER MANAGEMENT SYSTEM

[75] Inventors: Carl A. Reiser, Glastonbury; Richard D. Sawyer, Canton, both of Conn.

[73] Assignee: International Fuel Cells Corporation, South Windsor, Conn.

[21] Appl. No.: 121,008

[22] Filed: Nov. 16, 1987

[51] Int. Cl.[4] .......................... H01M 8/04; H01M 2/00
[52] U.S. Cl. ......................................... 429/17; 429/30; 429/33; 429/34
[58] Field of Search .................. 429/17, 30, 33, 34–39

[56] References Cited

U.S. PATENT DOCUMENTS

| | | | |
|---|---|---|---|
| 4,175,165 | 11/1979 | Adlhart | 429/33 X |
| 4,478,917 | 10/1984 | Fujita et al. | 429/33 |
| 4,515,871 | 5/1985 | Sirogami et al. | 429/34 |
| 4,537,840 | 8/1985 | Tsukui et al. | 429/33 |

Primary Examiner—Brian E. Hearn
Assistant Examiner—Stephen J. Kalafut
Attorney, Agent, or Firm—W. W. Jones

[57] ABSTRACT

Water is fed into the fuel cell stack in the hydrogen reactant stream. Some of the water is evaporated in the cells to cool the stack, and some of the water migrates through the stack from cell to cell. The water migration is the result of the water being dragged from the anode to the cathode through the electrolyte membrane and by the use of porous hydrophilic separator plates being interposed between adjacent cells in the stack. Water is forced through these porous separator plates by means of a reactant pressure differential maintained between the cathode and anode. The anode support plates provide a large surface area from which water is evaporated to perform the cooling function.

8 Claims, 2 Drawing Sheets

SOLID POLYMER ELECTROLYTE FUEL CELL STACK WATER MANAGEMENT SYSTEM

DESCRIPTION

1. Technical Field

This invention relates to a water management system for a solid polymer fuel cell stack, and more particularly to a system wherein water migrates through the stack components to ensure that the electrolyte membranes do not dry out. Some of the water in the stack evaporates to perform a cooling function.

2. Background Art

Solid polymer fuel cells are conceptually very simple, but in practice have been complex structures due to the need to remove product water, while at the same time guarding against drying out of the electrolyte membranes. The prior art solid polymer cells utilize wicks, gravity fed sumps, and separate circulating gas cooling systems to remove water and cool the cells. These approaches add to the complexity of the cell stack, increase its bulkiness and weight, and can cause localized membrane dryout which results in cell failure. The water problem is caused, in part, by the fact that water is dragged from the anode side through the membrane and to the cathode side thereof during the electrochemical reaction. The water, if not removed, will collect on the cathode side of the membrane and prevent the oxygen reactant from reaching the cathode.

DISCLOSURE OF INVENTION

The water management system of this invention ensures that water will not collect on the cathode side of the membrane, and also uses the water as a coolant for the cells in the stack. The reactant flow fields are formed by ribbed porous graphite plates on either side of the electrolyte membrane. A porous hydrophilic graphite separator plate is interposed between each cell in the stack, so that the sequence in the stack will be: anode flow field plate; anode; electrolyte membrane; cathode; cathode flow field plate; separator plate; anode flow field plate; anode; and so forth, the successive members repeating in like fashion to form the stack. Hydrogen is fed to the anode side via the anode flow field plate, and oxygen is fed to the cathode side via the cathod flow field plate. Water is also fed into the anode side of the cells, the water being entrained in the hydrogen reactant gas. The water diffuses into the porous anode flow field plate from whence some of it is vaporized by heat from the cell to help cool the cell. Some of the water also migrates through the anode flow field plate to the anode and electrolyte membrane. As previously noted, water is constantly dragged through the membrane by the protons which carry the ionic current from the anode side to the cathode side. The cathode flow field plate absorbs both the water which is formed by the electrochemical reaction, and that which is dragged across the membrane by the electrochemical reaction.

The stack is operated with different reactant pressures, the oxygen pressure being higher than the hydrogen pressure. This differential cathode-anode pressure causes the water which is wicked to the porous hydrophilic separator plate by the cathode flow field plate to be pumped through the hydrophilic separator plate, into the anode flow field plate in the next cell. Thus the water management system of this invention involves introducing water into each cell in the hydrogen gas stream, and also for every cell except the first cell, moving water from one cell to the next from the cathode of one cell to the anode of the next cell. The water which is pumped into the anode flow field plate joins the water in the hydrogen gas stream. The anode flow field plates in each cell provide large surface area, moist bodies from which water will evaporate to control the temperature of the stack. The resultant water vapor is swept out of the cells in the hydrogen reactant exhaust stream. The hydrogen exhaust stream is routed through a condenser where the water is removed and the dried hydrogen exhaust is returned to the stack. The bulk of the recovered water is fed back into the anode side of the cells in the stack to be reevaporated to provide cooling. The remainder, the product water, is ejected from the system.

It is therefore an object of this invention to provide an improved water management system for a solid polymer electrolyte fuel cell stack.

It is a further object of this invention to provide a water management system of the character described which removes product water from the cells and also fulfills the cooling needs of the stack.

It is an additional object of this invention to provide a water management system of the character described which utilizes water migration through porous cell plates aided by differential reactant pressures to accomplish its purposes.

It is another object of this invention to provide a water management system of the character described wherein water is conserved in the system so that the system requires no externally sourced makeup water to operate.

These and other objects and advantages of the system of this invention will become more readily apparent from the following detailed description of a preferred embodiment thereof, when taken in conjunction with the accompanying drawings, in which:

BEST MODE FOR CARRYING OUT THE INVENTION

Figure 1:
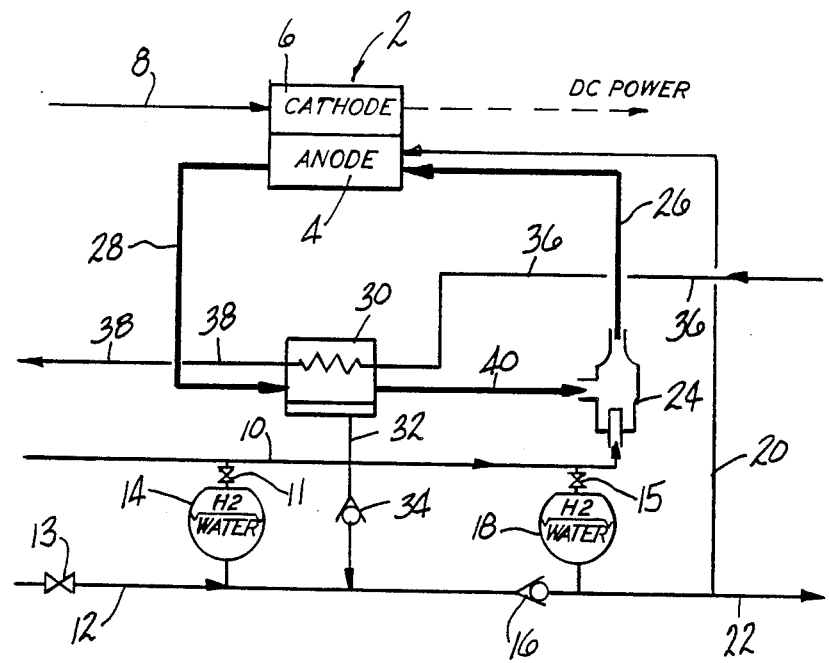
FIG. 1 is a schematic representation of a preferred embodiment of the water management system of this invention.

The system shown in FIG. 1 is designed for use in earth orbiting vehicles or in submerged underwater installations, and uses hydrogen and oxygen as the reactants. The system includes a power section 2 having an anode side 4 and a cathode side 6. It will be appreciated that the power section 2 is actually a stack of cell assemblies, each of which has a cathode and anode, positioned one atop the other. Oxygen is supplied to the cathode side 6 of the power section 2 via line 8. The oxygen is dead-ended in the cells so that there is no oxygen exhaust in the system. Hydrogen enters the system via line 10, and water enters the system via line 12.

A low pressure water tank 14 is filled with water by opening a valve 13 in line 12. After the initial filling, the valve 13 is closed and remains closed during operation of the stack 2. The water in the low pressure tank 14 will be periodically transferred to a high pressure tank 18 by opening a valve 11 which connects the high pressure hydrogen line 10 with the tank 14 while concurrently closing a valve 15 which disconnects the tank 18 from the hydrogen line 10. In this manner pressure in the tank 14 temporarily exceeds the pressure in the tank 18, so that the water in the tank 14 will flow through the line 12, past the check valve 16 and into the tank 18 and line 20. When the tank 18 is filled, the valve 11 is closed and the valve 15 is reopened. This restores the high pressure to the tank 18 and drops the pressure in the tank 14. Water passes through the line 22 to a water storage tank (not shown) in the vehicle, and water also passes through a line 20 to the anode side 4 of the power section 2. High pressure (1000 psi) hydrogen passes from the supply line 10 through a an ejector 24 to line 26 which leads to the anode side 4 of the power section 2. The hydrogen and water mix together and pass through the anode side 4 of the power section. Movement of the water through the power section 2 will be explained in greater detail hereinafter. Depleted hydrogen containing water vapor leaves the power section 2 through line 28. The hydrogen-water vapor mixture passes through a condenser 30. The water vapor in the hydrogen exhaust condenses out in the condensor 30. Water from the condenser 30 flows through line 32 past check valve 34 and into the low pressure tank 14 where it accumulates for periodic transfer to the tank 18, as previously described. The pressure in the line 20 is sufficient to close the valve 16 against flow from lines 32 and 12 so long as the valve 15 is open. The effluent is fed into the ejector 24 through line 40 where it is mixed with the hydrogen from line 10. Coolant for the condenser 30 flows from the vehicle through line 36 and returns to the main vehicle cooling system through line 38.

Figure 2:
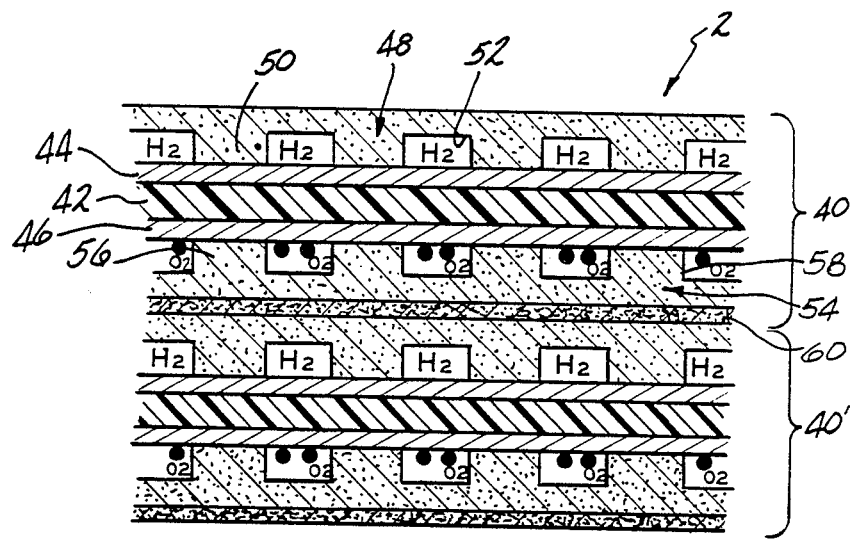
FIG. 2 is a fragmented sectional view of two adjacent cell assemblies in the power section of the power plant.

Referring now to FIG. 2, details of the power section 2 are shown. There are shown two adjacent cell assemblies 40 and 40'. The cell assembly 40 includes a polymeric electrolyte membrane 42 having an anode layer 44 on one side and a cathode layer 46 on the other side. A porous ribbed anode flow field plate 48 is disposed on the anode side of the cell 40, the plate 48 having a plurality of projections 50 with intervening grooves 52. The projections 50 contact the anode layer 44, and the grooves 52 define a flow path for the hydrogen fuel. A porous cathode flow field plate 54 is disposed on the cathode side of the cell 40, and includes a plurality of projections 56 which abut the cathode layer 46, with intervening grooves 58 which define the oxygen flow field path. Finally, a porous hydrophilic separator plate 60 completes the cell 40. The cell 40' is identical in construction to the cell 40. The flow field plates 48 and 54 can be likened to a waffle iron in appearance.

The water management system operates as follows. A water-hydrogen mixture is fed into each of the anode flow field plates 40 via grooves 52. The plates 40 are thus continuously moistened by the water entering the power section in the hydrogen reactant stream. The plates 40, being moist, provide large surface area evaporation bodies evenly dispersed throughout the power section. Heat created by operating the cells evaporates some of the water from the plates 48 thus cooling the power section. The resultant water vapor is swept out of the anode flow field in the exhausted hydrogen stream, and into the line 28 previously described. The anode to cathode proton transfer drags some of the water from the anode side across the electrolyte membrane 42 to the cathode side. In addition, the cathode-side electrochemical reaction forms molecules of new product water. Thus, significant amounts of water appear at the cathode side of each cell in the stack. With the water being entrained in the hydrogen gas stream, and the anode flow field plates 48 always being moist, the electrolyte membrane is constantly saturated with water, and never is subjected to the drying out problem encountered in the prior art solid polymer cells.

In FIG. 2, the droplets shown on the cathode side of the cells signify the water which appears on the cathode side. This water is absorbed into the porous projections 56 of the cathode flow field plate 54, thus ensuring that the cathode layer 46 will not be coated with a film of water. The pressure in the cathode side of the cells is maintained at a pressure of about 5 psia above the gas pressure on the anode side of the cells. This is accomplished by pressurizing the oxygen feed lines to a higher pressure than the hydrogen feed lines. This causes the cells to operate more efficiently and also results in a constant pressure imbalance between the cathode side of one cell and the adjacent anode side of the next cell. This pressure imbalance results in water being pumped constantly from the cathode flow plates 54 through the porous hydrophilic separator plates 60 into the adjacent anode flow field plates 48 in the next cell. Thus water is delivered to the anode side of the cells by being pumped across from the adjacent cell, as well as by the hydrogen stream. Water thus traverses the stack axially from one end to the other. The water entering the cathode side of the last cell in the stack is removed from the stack, preferably by transfer through an end-cell hydrophilic plate similar to those used in all other cells. This plate forms one side of an end-of-stack chamber which is vented into the stack hydrogen effluent line 28, from whence it is carried through the condensor to the low pressure water tank. The water filling the porous hydrophillic separator plates provides a bubble barrier which prevents gas cross-over between adjacent cells.

The appropriate amounts of water are provided for each of the cells in the stack as follows. The first cell in the stack will have, in molecular equivalents, five moles of water entrained in the hydrogen stream flowing into the anode side. Two moles of water will be dragged across the electrolyte membrane by the reaction, and three moles will be used for evaporative cooling. One mole of water will be formed in the membrane by the electrochemical reactions, thus three moles of water will be introduced into the cathode side of the first cell. The hydrogen stream of the second and all succeeding cells will have entrained therein only two moles of water. Those two moles of water will combine with the three moles pumped from the preceding cell cathode flow field plates through the separator plates, to form five moles of water in each of the succeeding cell anode sides. Thus each cell is provided with sufficient water to perform the cooling function, and to maintain the electrolyte membranes in a saturated state. The problem of water collecting in the cathode side of the membranes is prevented by the porous absorbant cathode flow field plates and by the pressure imbalance between the cathode reactant and the anode reactant which pumps water from one cell to the next through the porous flow field and separator plates. There is no separate cooling cell system required, and water does not collect in the cells as with the prior art.

The manner in which the water fed to the first cell is differentiated from the remaining cells is by additional water injection ports from the cell perimeter into the cell.

Figure 3:
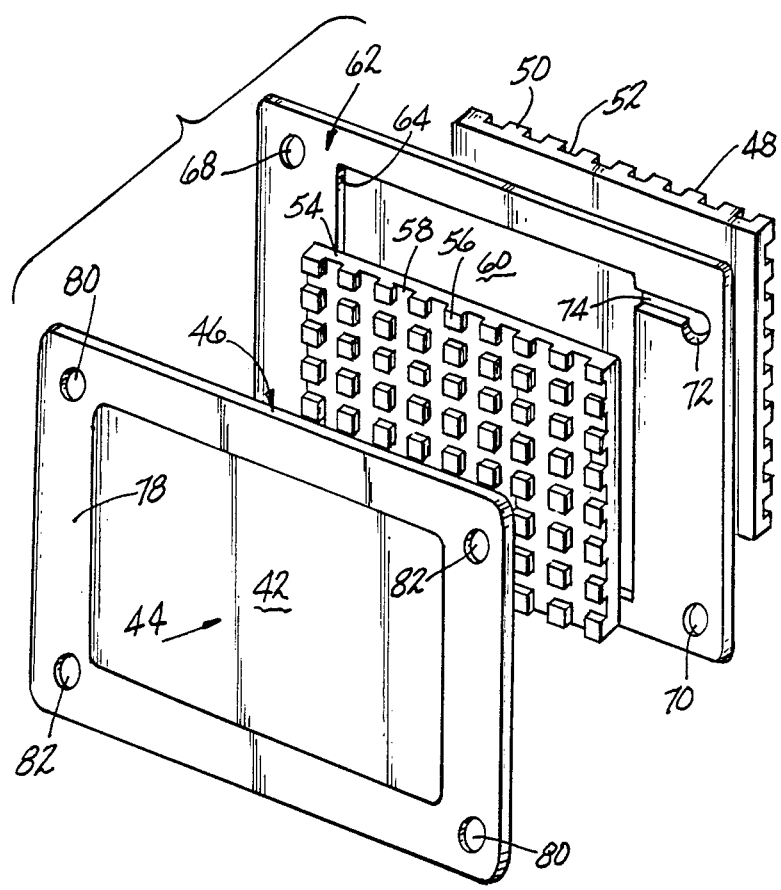
FIG. 3 is an exploded perspective view of the several components which form the cell assemblies used in the power plant of this invention.

Referring now to FIG. 3, there are shown preferred embodiments of the plates used to form the several components in the cell stack. The porous separator plate 60 is mounted in a frame 62 which is formed from carbon. The cathode flow field plate 54 fits into the recess 64 back-to-back with the separator plate 60. A hydrogen inlet opening 68 is formed in one corner of the frame 62 and a hydrogen outlet opening 70 is formed in the diagonally opposite corner of the recess 64. An oxygen inlet 72 is provided with an associated bleed passage 74 which provides a flow path for oxygen from the inlet 72 to the grooves 58 in the cathode flow field plate. There is also an oxygen outlet opening in the corner of the recess 64 diagonally opposite the opening 72 (not shown) which forms a part of a cathode purging manifold which is ordinarily closed by an external control valve, thus the oxygen is generally dead ended in the cathode side of each cell. The opposite side of the frame 62 is contoured in the same way with an inner recess for receiving the anode flow field plate 48. It will be appreciated that the hydrogen inlet and outlet openings 68 and 70 will have associated bleed passages therewith through which the hydrogen can flow into and out of the grooves 52 in the flow field plate 48. The electrolyte membrane 42 is mounted in a frame 78 which abuts the frame 62 so that the cathode layer 46 on the membrane 42 will be in face-to-face contact with the projections 56 on the cathode flow field plate 54. The frame 78 has hydrogen manifold ports 80 and oxygen manifold ports 82. It will be understood that there will be an additional frame overlying the anode plates 48 on the opposite side of the frame 62, and that the anode layer 44 will be in face-to-face contact with the anode flow field plate projections 50. The elements shown in FIG. 3 are stacked in repeating fashion to form the necessary number of cells in the stack.

It will be readily appreciated that the cell stack and water management system of this invention will ensure that the electrolyte membranes are saturated with water at all times, and will not dry out. By providing water to the cells with the hydrogen gas in excess amounts, there is always enough water in the anode flow field plates to provide sufficient evaporative cooling of the cells so that no additional cooling system is needed. This greatly simplifies construction of the stack. The proton drag effect plus the unequal reactant pressures cause water to migrate through the stack, axially, without the need of any auxiliary pumps.

Since many changes and variations of the disclosed embodiment of the invention may be made without departing from the inventive concept, it is not intended to limit the invention otherwise than as required by the appended claims.

We claim:

1. A solid polymer fuel cell stack power assembly comprising:
   (a) a plurality of fuel cells stacked one atop another, each of said fuel cells comprising:
      (i) a solid polymr electrolyte membrane;
      (ii) means forming an anode on one face of said electrolyte membrane, and means forming a cathode of an opposite face of said electrolyte membrane;
      (iii) a porous anode flow field plate disposed adjacent to said anode, said anode flow field plate having a contoured surface facing said anode with a plurality of grooves forming a hydrogen reactant flow field, and a plurality of intervening projections disposed in contact with said anode;
      (iv) a porous cathode flow field plate disposed adjacent to said cathode, said cathode flow field plate having a contoured surface facing said cathode with a plurality of grooves forming an oxygen reactant flow field, and a plurality of intervening projections disposed in contact with said cathode;
   (b) with the exception of an initial cell in the stack, each of said cells in the stack having its anode flow field plate disposed back-to-back with the cathode flow field plate of an adjacent cell;
   (c) porous hydrophilic separator plates interposed between each of the back-to-back anode and cathode flow field plates;
   (d) means for admitting hydrogen into said hydrogen reactant flow fields;
   (e) means for entraining sufficient water in the hydrogen prior to entering the hydrogen reactant flow fields to sufficiently moisten said anode flow field plates to an extent that cooling of said fuel cells is accomplished by evaporation of water from said anode flow field plates, and sufficient unevaporated water will remain in said anode flow field plates to saturate the anode faces of the electrolyte membranes;
   (f) means for admitting oxygen reactant into said oxygen reactant flow fields; and
   (g) means for maintaining the oxygen reactant flow fields at an operating pressure which is sufficiently greater than the operating pressure of said hydrogen reactant flow fields to force water absorbed by said cathode flow field plates from said cathode faces of said electrolyte membranes to flow through said porous separator plates and into said anode flow field plates in adjacent cells.

2. The assembly of claim 1 further comprising condenser means for condensing evaporated water out of a hydrogen/water vapor mixture exhausted from said anode flow fields.

3. The assembly of claim 2 further comprising recirculating means for recirculating the condensed water from said condenser means back to hydrogen reactant admitted to said anode flow fields.

4. The assembly of claim 3 wherein said recirculating means includes a pair of water holding tanks, one of which receives and stores water from said condenser means and the other of which supplies water to a pressurized hydrogen reactant flow stream.

5. The assembly of claim 4 comprising pressurizing means for selectively pressurizing each of said water tanks, whereby said one of said tanks can be temporarily pressurized to a higher pressure than said other of said tanks to periodically transfer water from said one tank to said other tank.

6. A solid polymer fuel cell stack power assembly comprising:
   (a) a first solid polymer electrolyte membrane in a first cell;
   (b) means forming a cathode on one side of said first electrolyte membrane;
   (c) a porous cathode flow field plate disposed adjacent to said cathode and in face-to-face contact with said cathode, said cathode flow field plate defining an oxygen reactant flow field plate defining an oxygen reactant flow field adjacent to said first electrolyte membrane, and said cathode flow field plate being operable to absorb water appearing on said cathode as a result of proton transfer through said first electrolyte membrane and as a result of the electrochemical reaction in said first electrolyte membrane and cathode;

(d) a hydrophilic porous separator plate adjacent to and in face-to-face contact with said cathode flow field, said separator plate being operable to absorb water from said cathode flow field plate;

(e) a second solid polymer electrolyte membrane having an anode thereon in a second cell adjacent to said first cell;

(f) a porous anode flow field plate in said second cell interposed between and in face-to-face contact with each of said separator plate and said second electrolyte membrane anode, said anode flow field plate defining a hydrogen reactant flow field adjacent to said second electrolyte membrane anode, and said anode flow field plate being operable to: absorb water from said separator plate; transfer water to said second electrolyte membrane; and provide water for evaporation in said hydrogen reactant flow field to cool said second cell and (g) means for providing a higher reactant pressure in said oxygen reactant flow field in said first cell than the reactant pressure in said hydrogen reactant flow field in said second cell whereby water is pumped through said flow field plates and said separator plate in the direction of said second cell by the pressure differential.

7. A method for operating a solid polymer fuel cell stack power plant, said method comprising the steps of:

(a) providing a series of adjacent solid polymer fuel cells to form said stack;

(b) supplying an anode side of each of said fuel cells with a stream of pressurized hydrogen reactant having water entrained therein;

(c) absorbing water from said hydrogen reactant stream into a porous anode flow field plate in each cell and transferring water from said anode flow field plate to the anode side of a solid polymer electrolyte membrane in each cell;

(d) absorbing product water and water dragged across said membrane by proton movement across the membrane, into a porous cathode flow field plate contacting the cathode side of said membrane in each cell;

(e) providing a hydrophilic porous separator plate between each pair of adjacent cells in the stack and absorbing water into each separator plate from each of the cathode flow field plates in the stack; and transferring water from each of the separator plates to an adjacent node flow field plate in an adjacent cell, whereby water moves along an axial flow path through the stack through each of the components thereof from one cell to the next until reaching the last cell along the flow path whereupon the water is removed from the stack, said water flow occurring continuously during operation of the stack; and (f) providing a pressurized stream of oxygen reactant to said cathode side of said membrane in each cell, said oxygen reactant stream being at a higher pressure than said hydrogen reactant stream to aid in transferring the water through said cathode flow field plates and separator plates, to the anode flow field plates in the adjacent cells.

8. The method of claim 7 wherein an excess amount of water is entrained in the hydrogen reactant stream sufficient to provide said anode flow field plates with water for evaporative cooling of each cell in the stack.

* * * * *